(12) United States Patent
Yamamoto et al.

(10) Patent No.: US 10,071,761 B2
(45) Date of Patent: Sep. 11, 2018

(54) ELECTRIC POWER STEERING APPARATUS

(71) Applicant: Mitsubishi Electric Corporation, Tokyo (JP)

(72) Inventors: Munenori Yamamoto, Tokyo (JP); Tomoya Iida, Hyogo (JP); Yosuke Ayukawa, Hyogo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/109,494

(22) PCT Filed: Apr. 21, 2014

(86) PCT No.: PCT/JP2014/061131
§ 371 (c)(1),
(2) Date: Jul. 1, 2016

(87) PCT Pub. No.: WO2015/162661
PCT Pub. Date: Oct. 29, 2015

(65) Prior Publication Data
US 2016/0325776 A1 Nov. 10, 2016

(51) Int. Cl.
*B62D 5/04* (2006.01)
*B62D 6/10* (2006.01)
(Continued)

(52) U.S. Cl.
CPC ............ *B62D 5/0463* (2013.01); *B62D 6/02* (2013.01); *B62D 6/10* (2013.01); *G01L 5/221* (2013.01)

(58) Field of Classification Search
CPC .......... B62D 5/0463; B62D 6/10; B62D 6/02; B62D 101/00–137/00; G01L 5/221
See application file for complete search history.

(56) References Cited

U.S. PATENT DOCUMENTS

| | | | | |
|---|---|---|---|---|
| 9,771,098 B2* | 9/2017 | Mikamo | ............... | B62D 5/0472 |
| 2003/0057913 A1* | 3/2003 | Matsushita | ............ | B62D 5/046 |
| | | | | 318/727 |

(Continued)

FOREIGN PATENT DOCUMENTS

| | | | | |
|---|---|---|---|---|
| DE | 10119968 A1 * | 2/2002 | ........... | B62D 5/0463 |
| JP | 3556083 B2 | 8/2004 | | |

OTHER PUBLICATIONS

Translation of DE-10119968-A1. Obtained Feb. 2, 2017 from ESPACENET. (Year: 2002).*

(Continued)

*Primary Examiner* — Jeffrey C Boomer
(74) *Attorney, Agent, or Firm* — Sughrue Mion, PLLC; Richard C. Turner

(57) ABSTRACT

A first-stage phase compensator, a second-stage phase compensator, and a third-stage phase compensator are configured in such a way that a frequency at which a phase calculated through the transfer function of the first-stage phase compensator becomes maximal and a frequency at which a phase calculated through a transfer function of the first-stage phase compensator and the third-stage phase compensator becomes maximal coincide with each other; a motor for generating assist torque is controlled, based on a torque signal to which the first-stage phase compensator, the second-stage phase compensator, and the third-stage phase compensator have applied phase compensation.

6 Claims, 9 Drawing Sheets

(51) Int. Cl.
  *B62D 6/02* (2006.01)
  *G01L 5/22* (2006.01)

(56) References Cited

U.S. PATENT DOCUMENTS

| | | | |
|---|---|---|---|
| 2007/0162206 A1* | 7/2007 | Tamaizumi | B62D 5/0466 701/41 |
| 2007/0198153 A1* | 8/2007 | Oya | B62D 5/0463 701/41 |
| 2008/0297077 A1* | 12/2008 | Kovudhikulrungsri | H02P 21/22 318/400.02 |
| 2009/0099731 A1* | 4/2009 | Watanabe | B62D 6/008 701/41 |
| 2009/0192679 A1* | 7/2009 | Kobayashi | B62D 5/0463 701/42 |
| 2010/0204889 A1* | 8/2010 | Watanabe | B62D 5/0466 701/42 |
| 2010/0228441 A1* | 9/2010 | Watanabe | B62D 5/0457 701/41 |
| 2012/0061169 A1* | 3/2012 | Oblizajek | B62D 5/0472 180/446 |
| 2013/0030648 A1* | 1/2013 | Matsumoto | B60W 10/04 701/37 |
| 2013/0211677 A1* | 8/2013 | Oblizajek | B62D 5/0472 701/42 |
| 2015/0274202 A1* | 10/2015 | Tsunoda | B62D 5/04 180/446 |
| 2016/0031477 A1* | 2/2016 | Kimpara | B62D 5/0463 701/41 |
| 2016/0059886 A1* | 3/2016 | Tsunoda | B62D 5/0484 701/43 |

OTHER PUBLICATIONS

Sagara, "Basic Automatic Control", Morikita Publishing Co., Ltd., Dec. 25, 1978, pp. 152-153 (total 6 pages).

Communication dated Dec. 22, 2017, from European Patent Office in counterpart application No. 14890092.1.

* cited by examiner

ELECTRIC POWER STEERING APPARATUS

CROSS-REFERENCE TO RELATED APPLICATION

This application is a National Stage of International Application No. PCT/JP2014/061131, filed on Apr. 21, 2014, the contents of all of which are incorporated herein by reference in their entirety.

TECHNICAL FIELD

The present invention relates to an electric power steering apparatus to be mounted in a vehicle such as an automobile and particularly to a control device thereof.

BACKGROUND ART

As is well known, an electric power steering apparatus is to assist a driver's operation of steering wheels in such a way that a torque sensor detects steering torque exerted on a steering wheel by a driver of a vehicle, a motor produces driving torque corresponding to the detected steering torque, and then the driving torque produced by the motor is exerted on a steering mechanism of the vehicle.

In general, an electric power steering apparatus is configured in such a way as to provide a phase delay or a phase advance to a torque signal from a torque sensor so that the gain is adjusted. For example, in a conventional control device for an electric power steering apparatus disclosed in Patent Document 1, a first-stage phase advance compensator formed of hardware applies phase-advance compensation to a torque signal from a torque sensor at a frequency around the crossover frequency of a steering system; then, a second-stage phase advance compensator formed of software applies phase-advance compensation to the torque signal in a low frequency band that is mainly utilized in practical steering; furthermore, a third-stage phase delay compensator applies phase-advance compensation to the torque signal so that the phase margin further increases. In the foregoing control device for an electric power steering apparatus, each of the second-stage phase advance compensator and the third-stage phase delay compensator is formed of software for a microcomputer.

In a conventional electric power steering apparatus configured in such a manner as described above, because the gain increases in a frequency band that is utilized in practical steering, the responsiveness of the steering system can be raised and the phase margin also increases, so that the stability of the steering system can also be enhanced.

PRIOR ART REFERENCE

Patent Document

[Patent Document 1] Japanese Patent No. 3556083

DISCLOSURE OF THE INVENTION

Problems to be Solved by the Invention

The conventional electric power steering apparatus disclosed in Patent Document 1 has three phase compensator, as described above; the first-stage phase advance compensator for stabilizing the steering system is formed of hardware and performs phase-advance compensation, for example, in such a way that the phase at approximately 30 [Hz] advances at most, as represented in FIG. 2 of Patent Document 1. A torque signal to which the first-stage phase advance compensator has applied phase-advance compensation is A/D-converted and then received by a microcomputer; at that time, the torque signal is A/D-converted at a frequency, for example, 1 [kHz] that is sufficiently higher than the foregoing approximately 30 [Hz] at which phase compensation is required in order to stabilize the steering system. As a result, the microcomputer receives a torque signal whose high-frequency components are amplified. In the case of this conventional apparatus, there has been a problem that because the first-stage phase advance compensator is formed of hardware, the product cost increases.

In contrast, when in order to reduce the product cost, the forgoing phase advance compensator formed of hardware is replaced by a phase advance compensator formed of software, the phase advance compensator formed of software receives a torque signal, from a torque sensor, that has been A/D-converted, and performs phase advance compensation based on the characteristics represented in FIG. 2 of the foregoing Patent Document 1; thus, high-frequency components including a quantization error caused by the sampling frequency for the A/D conversion, noise, or the like is amplified. Accordingly, when the handwheel is held, a motor assist current for assisting the handwheel is calculated by use of a torque signal including vibrating components caused by the foregoing quantization error; thus, in comparison with the conventional apparatus disclosed in Patent Document 1, the merchantability is deteriorated because the steering torque at a time when the steering wheel is held includes vibrating components. As a result, there has been a problem, for example, that it is difficult to replace the phase advance compensator formed of hardware by a phase advance compensator formed of software.

The present invention has been implemented in order to solve the foregoing problems; the objective thereof is to provide a more inexpensive electric power steering apparatus that prevents a quantization error caused through A/D conversion by a microcomputer from deteriorating the steering feeling, without impairing the stability of the steering system.

Means for Solving the Problems

An electric power steering apparatus according to the present invention includes a torque sensor that detects steering torque exerted on a steering system of a vehicle by a driver of the vehicle and then outputs a torque signal, a motor that is coupled with the steering system, generates assist torque for assisting steering by the driver, and then exerts the assist torque on the steering system, and a controller that drives the motor in such a way that the assist torque corresponding to the torque signal is generated; the electric power steering apparatus is characterized in that the controller includes at least a first-stage phase compensator that is formed of software and applies phase compensation to the torque signal outputted from the torque sensor, a second-stage phase compensator that is formed of software and applies phase compensation to a torque signal to which phase compensation has been applied by the first-stage phase compensator, and a third-stage phase compensator that is formed of software and applies phase compensation to a torque signal to which phase compensation has been applied by the second-stage phase compensator, in that letting T1 and T2 denote time constants, a transfer function of the first-stage phase compensator is given by a Laplace transformation equation $(1+T1 \cdot s)/(1+T2 \cdot s)$, in that letting T3 and T4 denote time constants, a transfer function of the second-stage phase compensator is given by a Laplace transformation equation (1+T3·s)/(1+T4·s), in that letting T5 and T6 denote time constants, a transfer function of the third-stage phase compensator is given by a Laplace transformation equation (1+T5s)/(1+T6·s), in that the first-stage phase compensator, the second-stage phase compensator, and the third-stage phase compensator are configured in such a way that a frequency at which a phase calculated through the transfer function of the first-stage phase compensator becomes maximal and a frequency at which a phase calculated through a transfer function of the first-stage phase compensator and the third-stage phase compensator becomes maximal coincide with each other, and in that the controller controls the motor, based on a torque signal to which the first-stage phase compensator, the second-stage phase compensator, and the third-stage phase compensator have applied phase compensation.

Advantage of the Invention

The electric power steering apparatus according to the present invention reduces the effect of a quantization error and hence an in expensive electric power steering control apparatus can be provided.

BEST MODE FOR CARRYING OUT THE INVENTION

Embodiment 1

Figure 1:
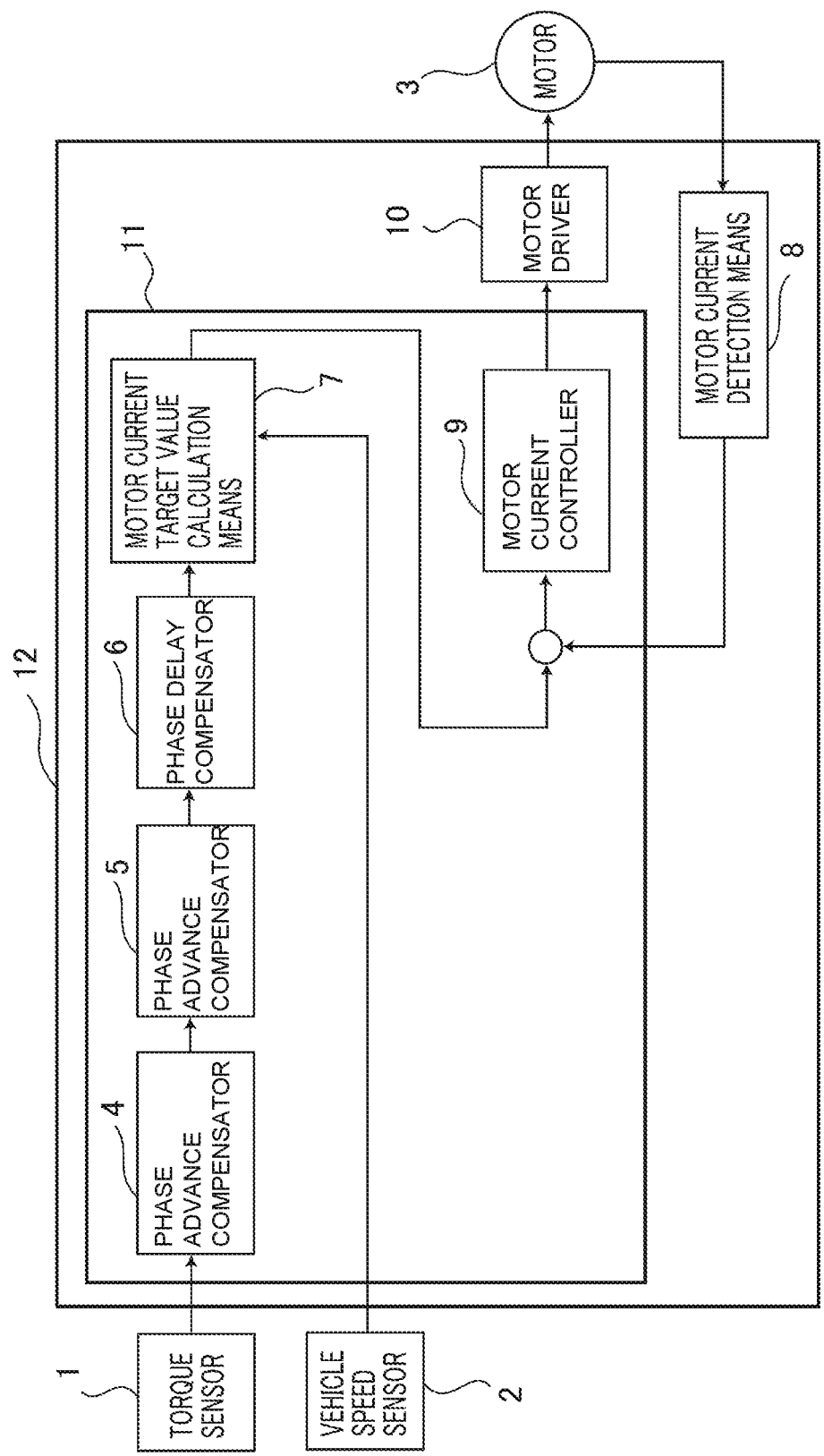
FIG. 1 is a block diagram representing control in an electric power steering apparatus according to Embodiment 1 of the present invention.

Hereinafter, an electric power steering apparatus according to Embodiment 1 of the present invention will be explained in detail with reference to the accompanying drawings. FIG. 1 is a block diagram representing control in an electric power steering apparatus according to Embodiment 1 of the present invention. In FIG. 1, a torque sensor 1 detects steering torque exerted on a steering wheel (although referred to also as a handle, referred to as a steering wheel, in the following explanation) by a driver of a vehicle and then outputs a torque signal. A vehicle speed sensor 2 detects the traveling speed of the vehicle so as to output a vehicle speed signal.

A motor 3 is controlled by an electric power steering controller 12, based on the torque signal from the torque sensor 1, and outputs assist torque to be exerted on a steering mechanism (unillustrated). The electric power steering controller 12 is provided with a microcomputer 11, a motor driver 10 formed of an electronic circuit, and a motor current detection means 8 formed of an electronic circuit.

The microcomputer 11 includes a phase advance compensator as a first-stage phase compensator (referred to as a first-stage phase advance compensator, hereinafter) 4, a phase advance compensator as a second-stage phase compensator (referred to as a second-stage phase advance compensator, hereinafter) 5, a phase delay compensator as a third-stage phase compensator (referred to as a third-stage phase delay compensator, hereinafter) 6, a motor current target value calculation means 7, and a motor current controller 9; each of these means is formed of software.

In order to raise the responsiveness and the stability of the whole steering system, the first-stage phase advance compensator 4 formed of software applies phase-advance compensation to a torque signal, from the torque sensor 1, that has been A/D-converted at a high frequency such as 1 [kHz] and received by the microcomputer 11. As described later, the second-stage phase advance compensator 5 and the third-stage phase delay compensator 6, which are formed of software, compensate the frequency characteristics of the first-stage phase advance compensator 4.

The motor current target value calculation means 7 calculates the target value of an electric current to be supplied to the motor 3. The motor current detection means 8 detects an electric current in the motor 3. By use of a motor current target value from the motor current target value calculation means 7 and a motor current detection value from the motor current detection means 8, the motor current controller 9 calculates and outputs a motor current control signal for controlling the motor current. The motor driver 10 drives the motor 3, based on the motor current control signal calculated by the motor current controller 9.

Figure 2:
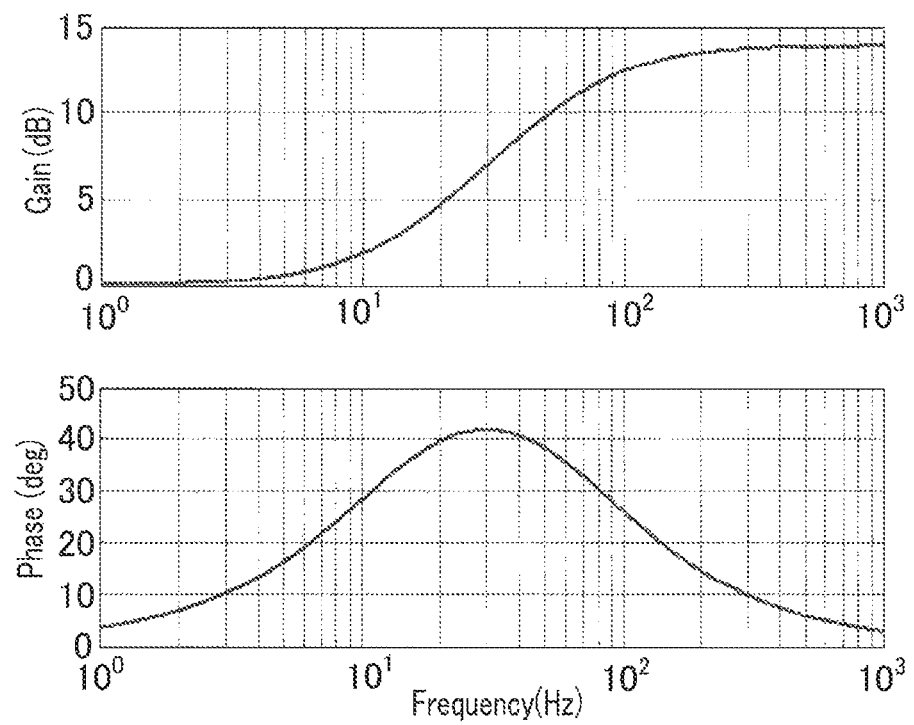
FIG. 2 is a characteristic chart representing the frequency characteristics of a first-stage phase advance compensator in the electric power steering apparatus according to Embodiment 1 of the present invention.

Next, the operation of the electric power steering apparatus configured as described above will be explained. At first, the first-stage phase advance compensator 4 applies phase compensation to the torque signal, from the torque sensor 1, that is inputted to the electric power steering controller 12. FIG. 2 is a characteristic chart representing the frequency characteristics of a first-stage phase advance compensator in the electric power steering apparatus according to Embodiment 1 of the present invention.

The phase 61 for a frequency in the Laplace-transform equation[(1+T1·s)/(1+T2·s)] of a transfer function can be calculated through the equation (1) below (for example, refer to "Basic Automatic Control" by Setsuo Sagara, Morikita Publishing Co., Ltd.).

$$\theta1=\arctan(T2\cdot\omega)-\arctan(T1\cdot\omega) \quad (1)$$

where each of T1 and T2 is the time constant of the first-stage phase advance compensator 4, and ω is an angular frequency.

The frequency at which the phase θ1 to be calculated through the equation (1) becomes maximal is obtained by calculating, through the equation (2) below, an angular frequency ω at which the changing amount of the phase θ1 becomes "0", i.e., the value obtained by differentiating the equation (1) becomes "0".

$$T2/(T2^2\cdot\omega^2+1)-T1/(T1^2\cdot\omega^2+1)=0 \quad (2)$$

Next, the phase θ2 for an angular frequency in the second-stage phase advance compensator 5 and the third-stage phase delay compensator 6 is calculated as represented in the equation (3).

$$\theta2=\arctan(T4\cdot\omega)-\arctan(T3\cdot\omega)-\arctan(T6\cdot\omega)+\arctan(T5\cdot\omega) \quad (3)$$

where each of T3 and T4 is the time constant of the second-stage phase advance compensator 5; each of T5 and T6 is the time constant of the third-stage phase delay compensator 6; ω is an angular frequency.

The frequency at which the phase θ2 becomes maximal is obtained by calculating, through the equation (4) below, an angular frequency ω at which the changing amount of the phase θ2 becomes "0", i.e., the value obtained by differentiating the equation (3) becomes "0".

$$T4/(T4^2\cdot\omega^2+1)-T3/(T3^2\cdot\omega^2+1)-T5/(T5^2\cdot\omega^2+1)+T6/(T6^2\cdot\omega^2+1)=0 \quad (4)$$

The corner frequencies of the second-stage phase advance compensator 5 are given by the equations (5) and (6) below.

$$f3=1/(2\pi\cdot T3) \quad (5)$$

$$f4=1/(2\pi\cdot T4) \quad (6)$$

Figure 3:
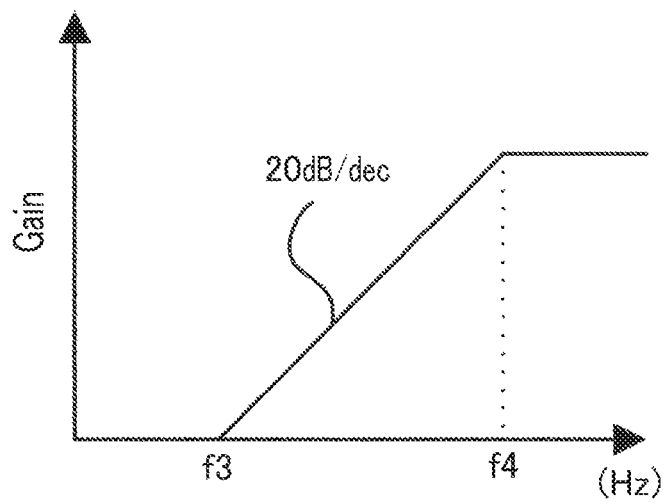
FIG. 3 is an explanatory graph representing the frequency characteristics of the gain of a second-stage phase advance compensator in the electric power steering apparatus according to Embodiment 1 of the present invention.

FIG. 3 is an explanatory graph representing the frequency characteristics of the gain of the second-stage phase advance compensator in the electric power steering apparatus according to Embodiment 1 of the present invention. From the corner frequencies f3 and f4 given by the equations (5) and (6), respectively, the relationship between the gain and the frequency of the second-stage phase advance compensator 5 can simply be represented by FIG. 3; in this case, the amount of gain increment due to the second-stage phase advance compensator 5 is simply given by the equation (7) below.

$$G2=20\cdot\log(f4/f3) \quad (7)$$

where G2 is the simplified calculation value of the amount of gain increment due to the second-stage phase advance compensator 5.

The corner frequencies of the third-stage phase delay compensator 6 are given by the equations (8) and (9) below.

$$f5=1/(2\pi\cdot T5) \quad (8)$$

$$f6=1/(2\pi\cdot T6) \quad (9)$$

Figure 4:
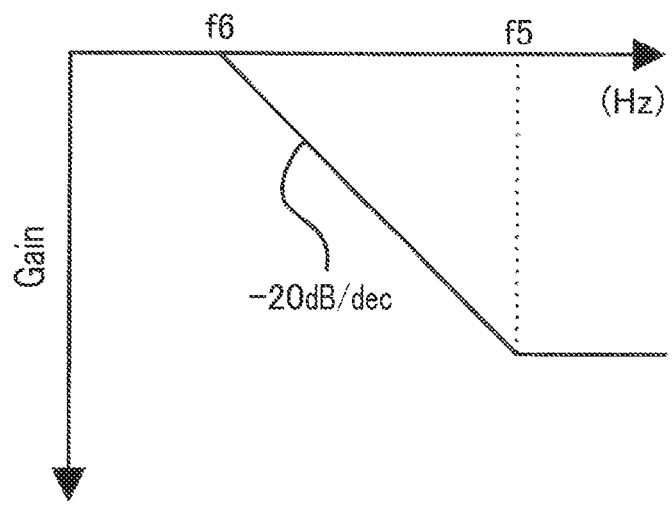
FIG. 4 is an explanatory graph representing the frequency characteristics of the gain of a third-stage phase delay compensator in the electric power steering apparatus according to Embodiment 1 of the present invention.

FIG. 4 is an explanatory graph representing the frequency characteristics of the gain of the third-stage phase delay compensator in the electric power steering apparatus according to Embodiment 1 of the present invention. From the corner frequencies f5 and f6 given by the equations (8) and (9), respectively, the relationship between the gain and the frequency of the third-stage phase delay compensator 6 can simply be represented by FIG. 4; in this case, the amount of gain decrement due to the phase compensation is simply given by the equation (10) below.

$$G3=-20\cdot\log(f5/f6) \quad (10)$$

where G3 is the simplified calculation value of the amount of gain decrement due to the third-stage phase delay compensator 6.

The gain at a time when the phase compensation is performed by use of the second-stage phase advance compensator 5 and the third-stage phase delay compensator 6 becomes a value obtained by the addition of the equations (7) and (10); therefore, when the corner frequencies are set in such a way that f4/f3<f5/f6, the gain can be decreased through the phase compensation by the second-stage phase advance compensator 5 and the third-stage phase delay compensator 6.

For example, when by use of the relational equation (2) and (4), the corner frequencies f1, f2, f3, f4, f5, and f6 are set to 13.4 [Hz], 67 [Hz], 19 [Hz], 28.5 [Hz], 3 [Hz], and 1.5 [Hz], respectively, the frequency at which the phase 61 of the first-stage phase advance compensator 4 becomes maximal is 30 [Hz], as represented in FIG. 2. Meanwhile, the frequency at which the phase θ2 obtained through the second-stage phase advance compensator 5 and the third-stage phase delay compensator 6 becomes maximal is also 30 [Hz], as represented in FIG. 5.

Figure 5:
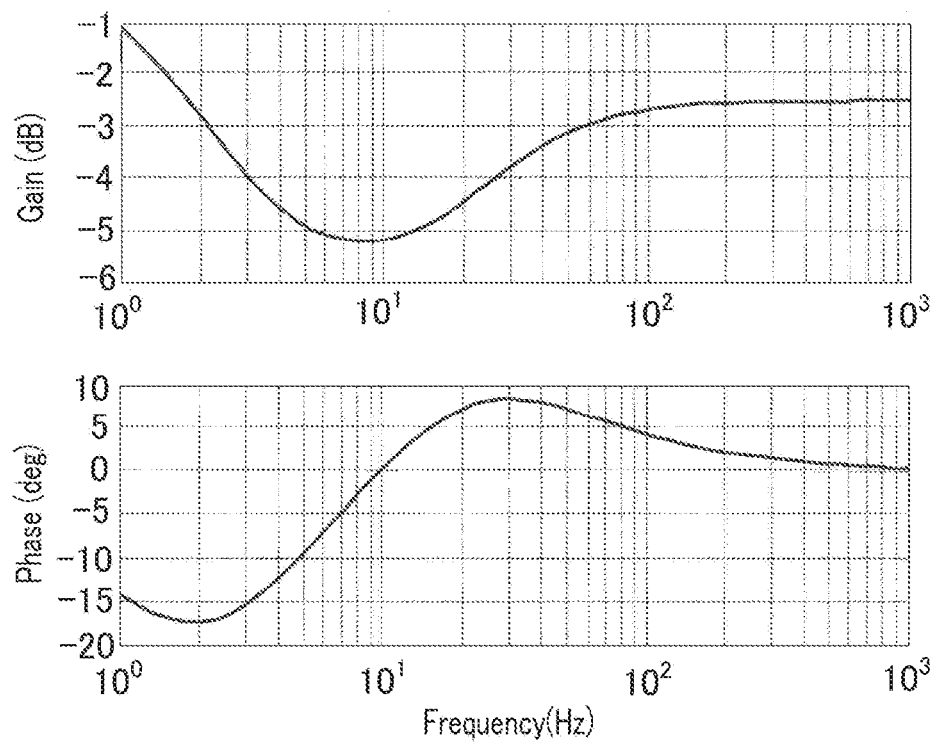
FIG. 5 is a characteristic chart representing frequency characteristics obtained by combining the frequency characteristics of the second-stage phase advance compensator and the frequency characteristics of the third-stage phase delay compensator in the electric power steering apparatus according to Embodiment 1 of the present invention.

In other words, FIG. 5 is a characteristic chart representing frequency characteristics obtained by combining the frequency characteristics of the second-stage phase advance compensator and the frequency characteristics of the third-stage phase delay compensator in the electric power steering apparatus according to Embodiment 1 of the present invention. As represented in FIG. 5, even when the torque signal from the torque sensor 1 is A/D-converted at a high frequency of, for example, 1 [kHz] and then is received by the microcomputer 11, the effect of a quantization error can be reduced because the gain decreases at the high frequency of 1 [kHz].

In FIG. 1, the torque signal to which phase compensation has been applied by the phase advance compensator 4, which is a first-stage phase compensator, the phase advance compensator 5, which is a second-stage phase compensator, and the phase delay compensator 6, which is a third-stage phase compensator, is inputted to the motor current target value calculation means 7. Based on the vehicle speed signal inputted from the vehicle speed sensor 2 and the torque signal to which the phase compensation is applied in such a manner as described above, the motor current target value calculation means 7 calculates a motor current target value, as represented in FIG. 6, for example.

Figure 6:
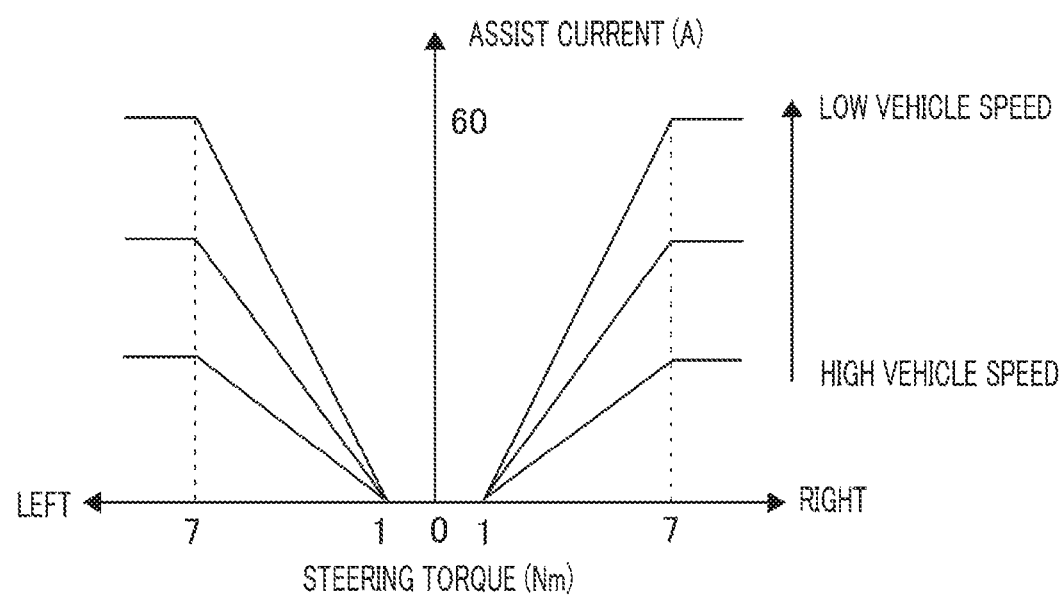
FIG. 6 is an explanatory graph representing the relationship between the assist current and the steering torque of the electric power steering apparatus according to Embodiment 1 of the present invention.

FIG. 6 is an explanatory graph representing the relationship between the assist current and the steering torque in the electric power steering apparatus according to Embodiment 1 of the present invention; the relationship between the steering torque and the motor current target value, as the assist current to be calculated based on the torque signal and the vehicle speed is represented. As illustrated in FIG. 6, in general, the motor current target value is set in such a way that the assist current becomes larger as the vehicle speed decreases.

In FIG. 1, based on the motor current target value from the motor current target value calculation means 7 and the motor current detection value detected by the motor current detection means 8, the motor current controller 9 calculates a motor driving signal and then outputs it to the motor driver 10. Based on the motor driving signal from the motor current controller 9, the motor driver 10 drives the motor 3 so that the motor 3 produces desired assist torque.

As described above, in the electric power steering apparatus according to Embodiment 1 of the present invention; the three phase compensator are combined so that without reducing the phase-advance angle at a frequency (e.g., 30 [Hz]) at which a phase compensator originally needs to advance the phase, the gain at a high frequency (e.g., 1 [kHz]) at which the effect of a quantization error is worrying is reduced; therefore, the first-stage phase compensator, which has been unable to be realized by anything but a hardware program, can be replaced by a software program; as a result, a more inexpensive electric power steering apparatus can be provided.

Embodiment 2

In foregoing Embodiment 1, the frequency characteristics of the phase compensator are fixed; however, in an electric power steering apparatus according to Embodiment 2 of the present invention, the frequency characteristics of at least one of the phase advance compensator 5 and the phase delay compensator 6 are changed in accordance with the steering state based on the vehicle speed; this configuration can raise the stability and the responsiveness.

Figure 7:
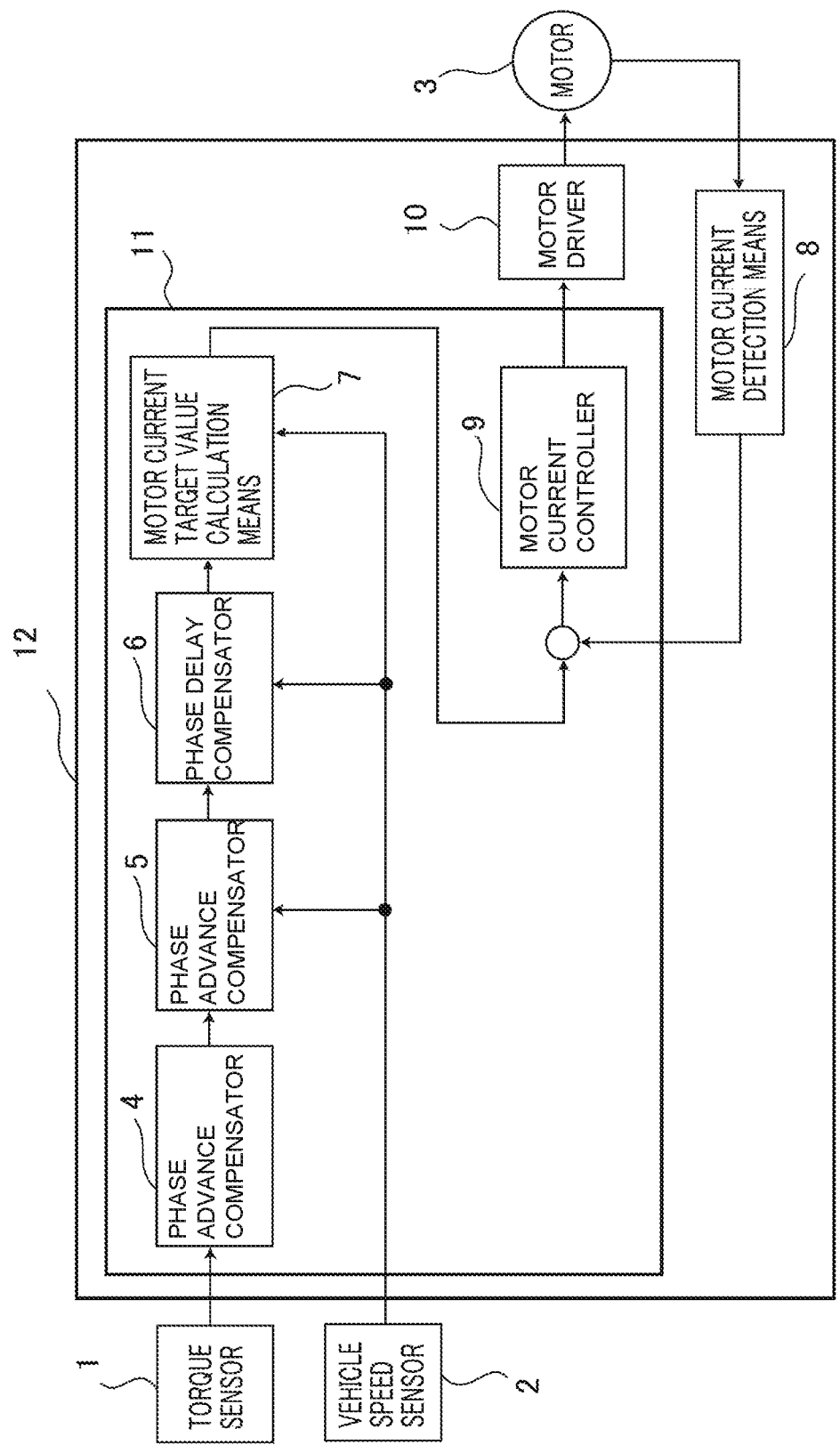
FIG. 7 is a block diagram representing control in an electric power steering apparatus according to Embodiment 2 of the present invention.

Hereinafter, an electric power steering apparatus according to Embodiment 2 of the present invention will be explained in detail with reference to the accompanying drawings. FIG. 7 is a block diagram representing control in the electric power steering apparatus according to Embodiment 2 of the present invention; in contrast to Embodiment 1 in FIG. 1, the vehicle speed signal from the vehicle speed sensor 2 is inputted to each of the phase advance compensator 5, which is a second-stage phase compensator, and the phase delay compensator 6, which is a third-stage phase compensator, so that the frequency characteristics of these phase compensator can be changed. The other configurations are the same as those in Embodiment 1 in FIG. 1.

Next, the operation of the electric power steering apparatus according to Embodiment 2 will be explained. At first, as is the case with Embodiment 1, described above, the first-stage phase advance compensator 4, the second-stage phase advance compensator 5, and the third-stage phase delay compensator 6 apply phase compensation to a torque signal that is outputted from the torque sensor 1 and is inputted to the electric power steering controller 12.

In this situation, because based on the vehicle speed signal from the vehicle speed sensor 2, the gradient of the assist current becomes large at a low vehicle speed, as represented in FIG. 6, the driver is liable to feel the fluctuation of the assist torque when the torque signal vibrates due to vibration components of a quantization error. Accordingly, in the electric power steering apparatus, represented in FIG. 7, according to Embodiment 2 of the present invention, the corner frequencies of each of the transfer functions of the second-stage phase advance compensator 5 and the third-stage phase delay compensator 6 are set in such a way that f4/f3<f5/f6, for example, that as represented in FIG. 5, f3, f4, f5, and f6 are 19 [Hz], 28.5 [Hz], 3 [Hz], and 1.5 [Hz], respectively, so that the gain at a high frequency (e.g., 1 [kHz]) at which the effect of a quantization error is worrying is reduced.

Figure 8:
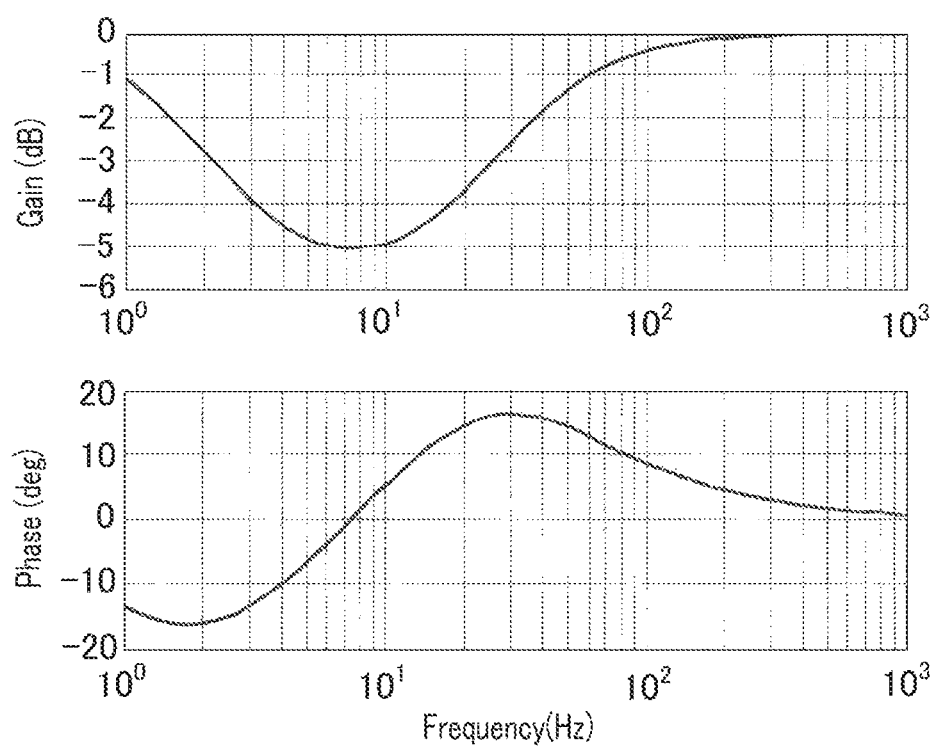
FIG. 8 is a characteristic chart representing frequency characteristics obtained by combining the frequency characteristics of the second-stage phase advance compensator and the frequency characteristics of the third-stage phase delay compensator in an electric power steering apparatus according to each of Embodiments 2, 3, and 4 of the present invention at a time when the high-frequency gain is "1"

In contrast, when the vehicle speed is high, the gradient of the assist current becomes small, as represented in FIG. 6; thus, even when due to vibration components of a quantization error, the torque signal vibrates, the driver does not readily feel the fluctuation of the assist torque. Accordingly, the corner frequencies of each of the transfer functions of the second-stage phase advance compensator 5 and the third-stage phase delay compensator 6 represented in FIG. 7 are set in such a way that f4/f3=f5/f6, for example, that as represented in FIG. 8, f3, f4, f5, and f6 are 18.3 [Hz], 36.6 [Hz], 3 [Hz], and 1.5 [Hz], respectively, so that even when the high-frequency gain, i.e., the responsiveness is not reduced, the effect of a quantization error at a high frequency (e.g., 1 [kHz]) at which the effect is worrying can be reduced. That is to say, FIG. 8 is a characteristic chart representing frequency characteristics at a time when the high-frequency gain is "1", obtained by combining the frequency characteristics of the second-stage phase advance compensator and the frequency characteristics of the third-stage phase delay compensator in an electric power steering apparatus according to each of Embodiment 2, and Embodiments 3 and 4, described later, of the present invention.

As described above, in the electric power steering apparatus according to Embodiment 2 of the present invention, the setting values in the transfer function of the second-stage phase advance compensator 5 represented in FIG. 7 is changed, based on the vehicle speed signal from the vehicle speed sensor 2, in such a way that when the vehicle speed is low, the gain at a high frequency at which the effect of a quantization error is worrying is reduced; when the vehicle speed is high, the steering torque vs. assist current characteristic represented in FIG. 6 is lowered and hence the setting values in the frequency characteristics of each of the second-stage phase advance compensator 5 and the third-stage phase delay compensator 6 are changed so that the gain is not reduced. As a result, the stability at a time of low vehicle speed and the responsiveness at a time of high vehicle speed can be raised.

Embodiment 3

In the electric power steering apparatus according to Embodiment 2, described above, of the present invention, the frequency characteristics of at least one of the second-stage phase advance compensator 5 and the third-stage phase delay compensator 6 are changed in accordance with the vehicle speed so that the responsiveness and the stability of the steering system are raised; however, the same effect is obtained also by changing the frequency characteristics of the phase compensator by use of a differential signal from a steering angle sensor, i.e., a steering angle speed. In an electric power steering apparatus according to Embodiment 3 of the present invention, the frequency characteristics of the phase compensator are changed by use of a differential signal from a steering angle sensor, i.e., a steering angle speed. The other configurations are the same as those in Embodiment 1 in FIG. 1.

Figure 9:
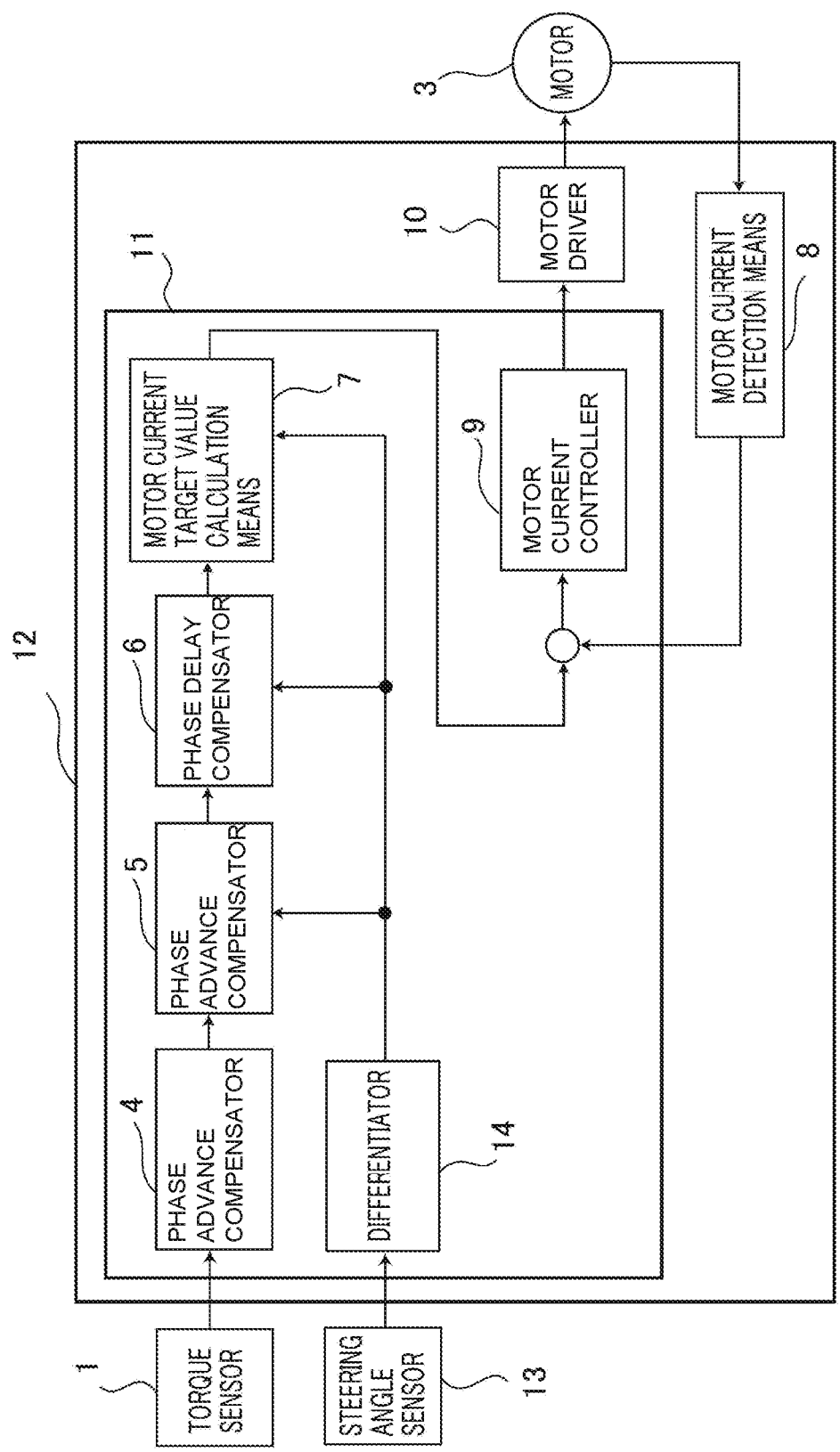
FIG. 9 is a block diagram representing control in an electric power steering apparatus according to Embodiment 3 of the present invention.

FIG. 9 is a block diagram representing control in an electric power steering apparatus according to Embodiment 3 of the present invention. In contrast to Embodiment 1 represented in FIG. 1, an electric power steering control device, represented in FIG. 9, according to Embodiment 3 of the present invention is provided with a steering angle sensor 13, instead of the vehicle sensor 2, that detects the angle of a steering wheel and outputs a steering angle signal and a differentiator 14 that applies, for example, a predetermined-time difference calculation to the steering angle signal from the steering angle sensor 13 so as to calculate the steering angle speed and to output a steering angle speed signal; the steering angle speed signal from the differentiator 14 is inputted to each of the second-stage phase advance compensator 5 and the third-stage phase delay compensator 6 so that the frequency characteristics of at least one of the second-stage phase advance compensator 5 and the third-stage phase delay compensator 6 can be changed in accordance with the steering angle speed. The other configurations are the same as those in Embodiment 1 in FIG. 1.

Next, the operation of the electric power steering apparatus according to Embodiment 3 of the present invention will be explained. At first, as is the case with Embodiment 1, described above, the first-stage phase advance compensator 4, the second-stage phase advance compensator 5, and the third-stage phase delay compensator 6 apply phase compensation to a torque signal that is outputted from the torque sensor 1 and is inputted to the electric power steering controller 12.

In this situation, in the case where when the steering angle speed is low, there is utilized a torque signal to which phase compensation is applied, by use of the steering angle speed signal from the differentiator 14, at a high frequency (for example, 1 [kHz]) at which the effect of a quantization error is worrying, the driver is liable to feel a steering-torque fluctuation caused by a micro vibration of the foregoing assist current represented in FIG. 6; thus, the corner frequencies of each of the transfer functions of the second-stage phase advance compensator 5 and the third-stage phase delay compensator 6, represented in FIG. 9, are set in such a way that f4/f3<f5/f6, for example, that as represented in FIG. 5, f3, f4, f5, and f6 are 19 [Hz], 28.5 [Hz], 3 [Hz], and 1.5 [Hz], respectively, so that the gain at a high frequency (e.g., 1 [kHz]) at which the effect of a quantization error is worrying is reduced.

In contrast, when the steering angle speed is high, the driver is not liable to feel a steering-torque fluctuation even when a micro vibration of the assist current occurs due to a high frequency (e.g., 1 kHz) at which the effect of a quantization error is worrying; because it is more required, in terms of enhancing the merchantability, to raise the responsiveness than to deal with the steering-torque fluctuation, the corner frequencies of each of the transfer functions of the second-stage phase advance compensator 5 and the third-stage phase delay compensator 6, represented in FIG. 9, are set in such a way that f4/f3=f5/f6, for example, that as represented in FIG. 8, f3, f4, f5, and f6 are 18.3 [Hz], 36.6 [Hz], 3 [Hz], and 1.5 [Hz], respectively, so that the gain is prevented from being reduced and hence the responsiveness is prevented from being lowered.

As described above, in the electric power steering apparatus according to Embodiment 3 of the present invention, when the steering angle speed is low and hence a micro vibration of the handwheel is worrying, the transfer functions of the second-stage phase advance compensator 5 and the third-stage phase delay compensator 6, represented in FIG. 9, are changed so that the gain at a high frequency at which the effect of a quantization error is worrying is reduced, and when the steering angle speed is so high that not the micro vibration of the handwheel but the deterioration in the responsiveness is worrying, the transfer functions of the second-stage phase advance compensator 5 and the third-stage phase delay compensator 6 are set in such a way that the gain at a high frequency is not reduced, so that the responsiveness can be prevented from decreasing.

Embodiment 4

In the electric power steering apparatus according to Embodiment 3, described above, of the present invention, the frequency characteristics of at least one of the second-stage phase advance compensator 5 and the third-stage phase delay compensator 6 are changed in accordance with the steering angle speed calculated based on the steering angle signal from the steering angle sensor so that the responsiveness and the stability of the steering system are raised; however, the same effect is obtained also by changing the frequency characteristics of the phase compensator by use of a differential signal based on a torque signal from a torque sensor. In an electric power steering apparatus according to Embodiment 4 of the present invention, neither a vehicle speed sensor 2 nor a steering angle sensor is utilized, but a differential signal based on a torque signal from a torque sensor is utilized so that the frequency characteristics of the phase compensator are changed. The other configurations are the same as those in Embodiment 1 in FIG. 1.

Figure 10:
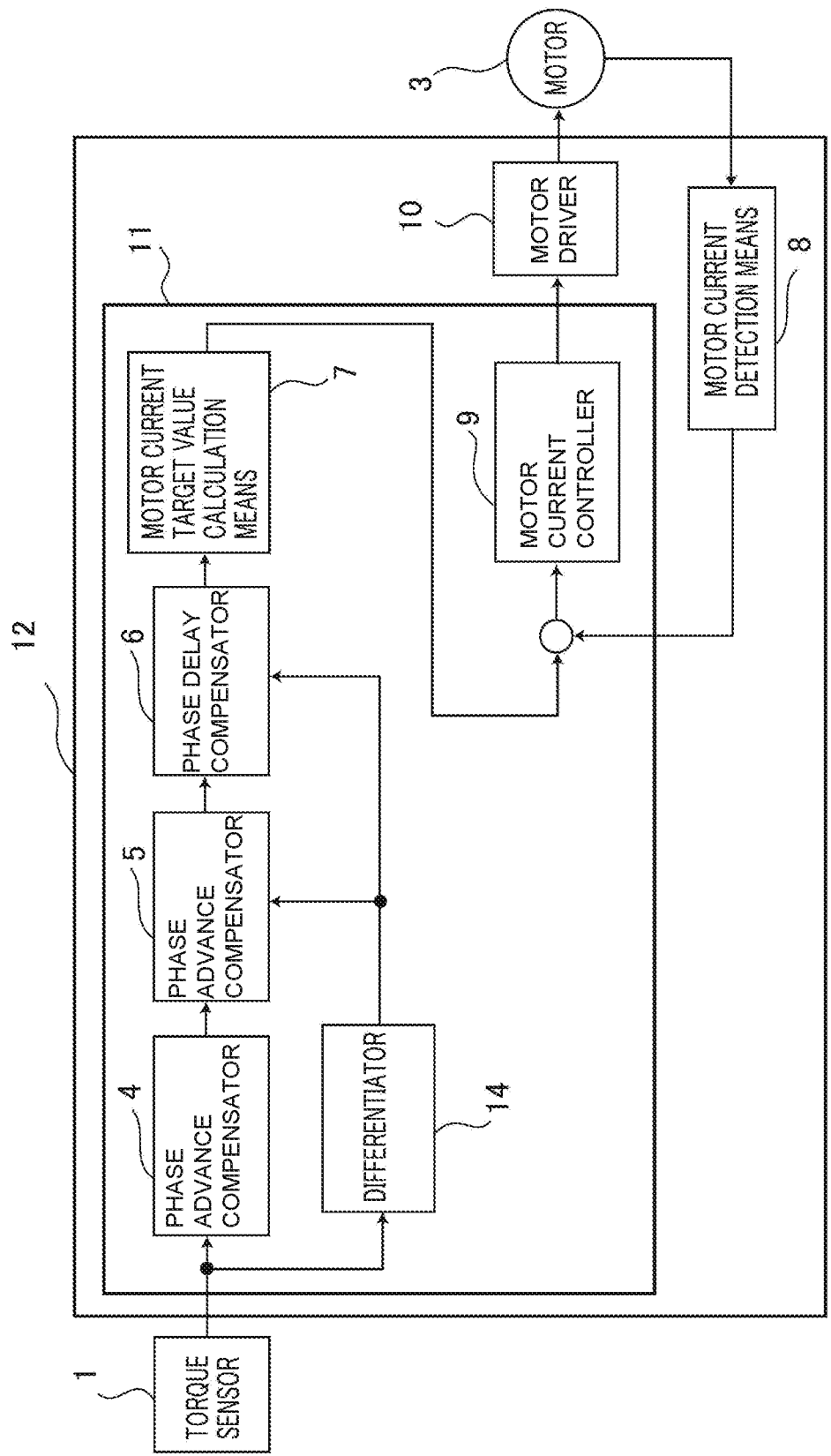
FIG. 10 is a block diagram representing control in an electric power steering apparatus according to Embodiment 4 of the present invention.

FIG. 10 is a block diagram representing control in an electric power steering apparatus according to Embodiment 4 of the present invention. In the electric power steering apparatus, represented in FIG. 10, according to Embodiment 4 of the present invention, unlike Embodiment 1 represented in FIG. 1, the vehicle speed sensor 2 is not provided and only the torque sensor 1 is utilized; there is provided a differentiator 14 that differentiates a torque signal from the torque sensor 1 so as to output a torque differential signal; the torque differential signal from the differentiator 14 is inputted to the second-stage phase advance compensator 5 and the third-stage phase delay compensator 6; the frequency characteristics of the second-stage phase advance compensator 5 and the third-stage phase delay compensator 6 can be changed in accordance with the torque differential signal.

Next, the operation of the electric power steering apparatus, represented in FIG. 10, according to Embodiment 4 of the present invention will be explained. At first, as is the case with Embodiment 1, described above, the first-stage phase advance compensator 4, the second-stage phase advance compensator 5, and the third-stage phase delay compensator 6 apply phase compensation to a torque signal that is outputted from the torque sensor 1 and is inputted to the electric power steering controller 12.

In this situation, in the case where when the torque changing amount is small, i.e., the steering wheel is held, there is utilized a torque signal to which phase compensation is applied, by use of the torque differential signal from the differentiator 14, at a high frequency (for example, 1 [kHz]) at which the effect of a quantization error is worrying, the driver is liable to feel a steering-torque fluctuation caused by a micro vibration of the foregoing assist current represented in FIG. 6; thus, the corner frequencies of each of the transfer functions of the second-stage phase advance compensator 5 and the third-stage phase delay compensator 6, represented in FIG. 10, are set in such a way that f4/f3<f5/f6, for example, that as represented in FIG. 5, f3, f4, f5, and f6 are 19 [Hz], 28.5 [Hz], 3 [Hz], and 1.5 [Hz], respectively, so that the gain at a high frequency (e.g., 1 [kHz]) at which the effect of a quantization error is worrying is reduced.

In contrast, in the case where when the torque changing amount is large, there is utilized a torque signal to which phase compensation has been applied at a high frequency (e.g., 1 [kHz]) at which the effect of a quantization error is worrying, the driver is not liable to feel a steering-torque fluctuation at a time when a micro vibration of the assist current occurs because the steering torque produced at a time when the driver is steering is sufficiently large in comparison with the steering-torque fluctuation; because it is more required, in terms of enhancing the merchantability, to raise the responsiveness than to deal with the steering-torque fluctuation, the corner frequencies of each of the transfer functions of the second-stage phase advance compensator 5 and the third-stage phase delay compensator 6, represented in FIG. 9, are set in such a way that f4/f3=f5/f6, for example, that as represented in FIG. 8, f3, f4, f5, and f6 are 18.3 [Hz], 36.6 [Hz], 3 [Hz], and 1.5 [Hz], respectively, so that the gain is prevented from being reduced and hence the responsiveness is prevented from being lowered.

As described above, in the electric power steering apparatus according to Embodiment 4 of the present invention, when the torque changing amount is small and hence a micro vibration of the handwheel is worrying, the frequency characteristics of the second-stage phase advance compensator 5 and the third-stage phase delay compensator 6, represented in FIG. 10, are changed so that the gain at a high frequency at which the effect of a quantization error is worrying is reduced, and when the torque changing amount is so large that not the micro vibration of the handwheel but the deterioration in the responsiveness is worrying, the frequency characteristics of the second-stage phase advance compensator 5 and the third-stage phase delay compensator 6 are set in such a way that the gain at a high frequency is not reduced, so that the responsiveness can be prevented from decreasing.

In the scope of the present invention, the embodiments thereof can freely be combined with one another and can appropriately be modified or omitted.

Each of the foregoing electric power steering apparatuses according to respective Embodiments of the present invention is the one in which at least any one of the following inventions is put into practice.

(1) An electric power steering apparatus comprising:
a torque sensor that detects steering torque exerted on a steering system of a vehicle by a driver of the vehicle and then outputs a torque signal;
a motor that is coupled with the steering system, generates assist torque for assisting steering by the driver, and then exerts the assist torque on the steering system; and
a controller that drives the motor in such a way that the assist torque corresponding to the torque signal is generated,
wherein the controller includes at least
a first-stage phase compensator that is formed of software and applies phase compensation to the torque signal outputted from the torque sensor,
a second-stage phase compensator that is formed of software and applies phase compensation to a torque signal to which phase compensation has been applied by the first-stage phase compensator, and
a third-stage phase compensator that is formed of software and applies phase compensation to a torque signal to which phase compensation has been applied by the second-stage phase compensator,
wherein letting T1 and T2 denote time constants, a transfer function of the first-stage phase compensator is given by a Laplace transformation equation $(1+T1 \cdot s)/(1+T2 \cdot s)$,
wherein letting T3 and T4 denote time constants, a transfer function of the second-stage phase compensator is given by a Laplace transformation equation $(1+T3 \cdot s)/(1+T4 \cdot s)$,
wherein letting T5 and T6 denote time constants, a transfer function of the third-stage phase compensator is given by a Laplace transformation equation $(1+T5 \cdot s)/(1+T6 \cdot s)$,
wherein the first-stage phase compensator, the second-stage phase compensator, and the third-stage phase compensator are configured in such a way that a frequency at which a phase calculated through the transfer function of the first-stage phase compensator becomes maximal and a frequency at which a phase calculated through a transfer function of the second-stage phase compensator and the third-stage phase compensator becomes maximal coincide with each other, and
wherein the controller controls the motor, based on a torque signal to which the first-stage phase compensator, the second-stage phase compensator, and the third-stage phase compensator have applied phase compensation.

(2) The electric power steering apparatus according to (1),
wherein each of the first-stage phase compensator and the second-stage phase compensator are phase advance compensator that apply phase-advance compensation to the torque signal, and
wherein the third-stage phase compensator is a phase delay compensator that applies phase-delay compensation to the torque signal.

(3) The electric power steering apparatus according to (2),
wherein when it is assumed that letting f3 and f4 denote corner frequencies, the respective transfer functions of the first-stage phase advance compensator and the second-stage phase advance compensator are given by the following equations:

$$f3<f4,$$

$$f3=1/(2\pi \cdot T3), \text{ and}$$

$$f4=1/(2\pi \cdot T4)$$

and that letting f5 and f6 denote corner frequencies, the transfer function of the third-stage phase delay compensator is given by the following equations:

$$f5>f6,$$

$$f5=1/(2\pi \cdot T5), \text{ and}$$

$$f6=1/(2\pi \cdot T6),$$

the respective corner frequencies of the second-stage phase advance compensator and the third-stage phase delay compensator are set in such a way that f4/f3<f5/f6.

(4) The electric power steering apparatus according to (3),
wherein as the vehicle speed of the vehicle becomes higher, the respective corner frequencies of the transfer functions of the second-stage phase advance compensator and the third-stage phase delay compensator are changed from setting values with which f4/f3<f5/f6 to setting values with which f4/f3=f5/f6.

In the electric power steering apparatus configured in such a manner described above, based on the output signal of the vehicle speed sensor, the respective frequency characteristics of the second-stage phase advance compensator and the third-stage phase delay compensator are changed in such a way that when the effect of a quantization error at a time of a low vehicle speed is large, the gain is reduced to cope with the effect and in such a way that at a time of a high vehicle speed, the gain is not reduced so that the responsiveness can be prevented from being deteriorated.

(5) The electric power steering apparatus according to (3),
wherein as the steering-angle changing amount of the vehicle becomes larger, the respective corner frequencies of the transfer functions of the second-stage phase advance compensator and the third-stage phase delay compensator are changed from setting values with which f4/f3<f5/f6 to setting values with which f4/f3=f5/f6.

In the electric power steering apparatus configured in such a manner as described above, when the steering angle speed is low and hence a micro vibration of the steering wheel is worrying, the gain is reduced, and when the steering angle speed is so high that not the micro vibration of the steering wheel but the deterioration in the responsiveness is worrying, the frequency characteristics of the second-stage phase advance compensator and the third-stage phase delay compensator are set in such a way that the gain is not reduced, so that the responsiveness can be prevented from decreasing.

(6) The electric power steering apparatus according to (3), wherein as the steering-torque changing amount of the vehicle becomes larger, the respective corner frequencies of the transfer functions of the second-stage phase advance compensator and the third-stage phase delay compensator are changed from setting values with which f4/f3<f5/f6 to setting values with which f4/f3=f5/f6.

In the electric power steering apparatus configured as described above, when the torque changing amount is small and hence a micro vibration of the steering wheel is worrying, the frequency characteristics of the second-stage phase advance compensator and the third-stage phase delay compensator are changed so that the gain at a high frequency at which the effect of a quantization error is worrying is reduced, and when the torque changing amount is so large that not the micro vibration of the steering wheel but the deterioration in the responsiveness is worrying, the frequency characteristics of the second-stage phase advance compensator and the third-stage phase delay compensator are set in such a way that the gain at a high frequency is not reduced, so that the responsiveness can be prevented from decreasing.

INDUSTRIAL APPLICABILITY

The present invention can be applied to the field of an electric power steering apparatus to be mounted in a vehicle such as an automobile or to the automobile industry.

The invention claimed is:

1. An electric power steering apparatus comprising:
   a torque sensor to detect steering torque that is exerted on a steering system of a vehicle by a driver of the vehicle, and then output a torque signal;
   a motor that is coupled with the steering system, to generate an assist torque for assisting steering by the driver, and then exert the assist torque on the steering system; and
   an electronic circuit implementing a motor driver to drive the motor such that the assist torque corresponding to the torque signal is generated,
   a microcomputer comprising:
      a first phase advance compensator that is formed of software, to apply a first phase compensation to the torque signal outputted from the torque sensor;
      a second phase advance compensator that is formed of software, to apply a second phase compensation to the torque signal to which the first phase compensation is applied by the first phase advance compensator; and
      a phase delay compensator that is formed of software, to apply a third phase compensation to the torque signal to which the second phase compensation is applied by the second phase advance compensator,
   wherein letting T1 and T2 denote time constants, a first transfer function of the first phase advance compensator is given by a first Laplace transformation equation $(1+T1 \cdot s)/(1+T2 \cdot s)$,
   wherein letting T3 and T4 denote time constants, a second transfer function of the second phase advance compensator is given by a second Laplace transformation equation $(1+T3 \cdot s)/(1+T4 \cdot s)$,
   wherein letting T5 and T6 denote time constants, a third transfer function of the phase delay compensator is given by a third Laplace transformation equation $(1+T5 \cdot s)/(1+T6 \cdot s)$,
   wherein the first phase advance compensator, the second phase advance compensator, and the phase delay compensator are configured such that a first frequency, at which a first phase that is calculated through the first transfer function of the first phase advance compensator becomes maximal, coincides with a second frequency, at which a second phase that is calculated through the second transfer function of the second phase advance compensator and the third transfer function of the phase delay compensator becomes maximal, and
   wherein the motor driver controls the motor, based on the torque signal to which the third phase compensation is applied by the phase delay compensator.

2. The electric power steering apparatus according to claim 1, wherein each of the first phase advance compensator and the second phase advance compensator applies a phase-advance compensation to the torque signal, and
   wherein the phase delay compensator applies a phase-delay compensation to the torque signal.

3. The electric power steering apparatus according to claim 2, wherein letting f3 and f4 denote first corner frequencies of the second phase advance compensator, the first corner frequencies of the second phase advance compensator are given respectively by the following equations:

$$f3<f4;$$

$$f3=1/(2\pi \cdot T3); \text{ and}$$

$$f4=1/(2\pi \cdot T4),$$

wherein letting f5 and f6 denote second corner frequencies of the phase delay compensator, the second corner frequencies of the phase delay compensator are given respectively by the following equations:

$$f5>f6;$$

$$f5=1/(2\pi \cdot T5); \text{ and}$$

$$f6=1/(2\pi \cdot T6), \text{ and}$$

wherein the first corner frequencies of the second phase advance compensator and the second corner frequencies of the phase delay compensator are set such that f4/f3<f5/f6.

4. The electric power steering apparatus according to claim 3, wherein in response to a vehicle speed of the vehicle being a high vehicle speed higher than a low vehicle speed, the first corner frequencies of the second phase advance compensator and the second corner frequencies of the phase delay compensator are changed from being set such that f4/f3<f5/f6 to being set such that f4/f3=f5/f6.

5. The electric power steering apparatus according to claim 3, wherein in response to a steering angle speed of the vehicle being a high steering angle speed higher than a low steering angle speed, the first corner frequencies of the second phase advance compensator and the second corner frequencies of the phase delay compensator are changed from being set such that f4/f3<f5/f6 to being set such that f4/f3=f5/f6.

6. The electric power steering apparatus according to claim 3, wherein in response to a steering-torque changing amount of the vehicle being a large steering-torque changing amount larger than a small steering-torque changing amount, the first corner frequencies of the second phase advance compensator and the second corner frequencies of the phase delay compensator are changed from being set such that f4/f3<f5/f6 to being set such that f4/f3=f5/f6.

* * * * *